(12) United States Patent
Shi

(10) Patent No.: US 6,643,508 B1
(45) Date of Patent: Nov. 4, 2003

(54) PACKET ROUTING TO A MOBILE STATION

(75) Inventor: Rong Shi, Abbey Meads (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/537,543

(22) Filed: Mar. 29, 2000

(30) Foreign Application Priority Data

Dec. 22, 1999 (GB) .............................................. 9930439

(51) Int. Cl.[7] .................................................. H04Q 7/20
(52) U.S. Cl. ...................... 455/428; 455/436; 455/445; 370/331; 370/338; 370/401
(58) Field of Search ................................. 455/428, 445, 455/436, 437, 439; 370/331, 338, 401

(56) References Cited

U.S. PATENT DOCUMENTS

| | | | | |
|---|---|---|---|---|
| 5,987,521 A | * | 11/1999 | Arrowood | ................... 709/239 |
| 6,310,859 B1 | * | 10/2001 | Morita | ........................ 370/235 |
| 6,385,170 B1 | * | 5/2002 | Chiu | ........................... 370/235 |
| 6,385,451 B1 | * | 5/2002 | Kalliokulju | .................. 455/437 |

* cited by examiner

Primary Examiner—William Trost
Assistant Examiner—Brandon J Miller

(57) ABSTRACT

A method of routing to a mobile station in a packet switched network arrangement. The method includes forming an initial packet switching route to a mobile station, extending the initial route to form an extended packet switching route, and forming a new packet switching route to replace the extended route dependent on a fall in level of quality of service parameter achieved over the extended route. The initial route is to a first cellular communications gateway and the extended and replacement routes are to a second cellular communications gateway. Also described is corresponding apparatus for routing. Also described is a storage medium storing processor implementable instructions and a signal carrying processor-implementable instructions.

24 Claims, 2 Drawing Sheets

PACKET ROUTING TO A MOBILE STATION

FIELD OF THE INVENTION

The present invention relates to a method of, and apparatus for, routing to a mobile station in a packet switched network arrangement. The present invention is applicable to, but not limited to, cellular communications systems such as the Universal Mobile Telecommunication System (UMTS) currently under standardisation.

BACKGROUND OF THE INVENTION

One type of communications system is a cellular communications system. In a cellular communications system, the area over which service is provided is divided into a number of smaller areas called cells. Typically, each cell is served from a base transceiver station (BTS) which has a corresponding antenna or antennas for transmission to and reception from a user station, normally a mobile station. An established harmonised system cellular radio communication system is GSM (Global System for Mobile Communications). A further harmonised system currently being defined is the universal mobile telecommunication system (UMTS), which is intended to provide a harmonised standard under which cellular radio communications networks and systems will provide enhanced levels of interfacing and compatibility with other types of communications systems and networks. In addition to speech and data services, increased provision of multimedia communications will be provided for. It is also expected that within the framework of developments such as UMTS or the like, cellular radio communication systems will increasingly interface with information networks such as the Internet.

Public data networks or information networks such as the Internet operate by the well known method of packet switching. Information to be transmitted across the Internet is packetized. The Internet consists of many nodes or Internet routers. A packet switching route is established between a source node and a destination node. Various methods of determining the routes are known. One method is called hop-by-hop routing. This is a dynamic method in which each Internet router makes its own decision about which next router to send the route forming details to where the route details can be in the form of a datagram. Another known method is source routing. Under source routing the route is selected by the source node for a certain data stream. In networks employing datagrams, some or all of the route from source to destination is explicitly stated in the datagrams. Both hop-by-hop and source routing are implemented in, for example, the Internet Protocol (IP). Two forms of source routing are used in IP networks. The first is strict source routing. Under strict source routing, a sender specifies the exact path that an IP datagram must follow. If an Internet router encounters as a next hop in the source route, a node that is not on the specified route, an ICMP (Internet Control Message Protocol) source route failed area message is returned. The second form is loose source routing. Under loose source routing the sender specifies a list of IP addresses that a datagram must traverse, but the datagram can also pass through other Internet routers between any two addresses in the list.

A cellular communications network can interface with a packet switched network arrangement such as the Internet via an Internet router serving as a gateway to the cellular communications network. Thus, when information is to be communicated to a mobile station in a cellular communications network or system, the route is established to the appropriate Internet router serving as the gateway of the cellular communications network.

The interaction between a mobile station in a cellular communications network and a general packet switched network arrangement, as described above, creates a broad range of new engineering problems and challenges. One challenge is to consider whether previously known methods of performing the routing within the packet switched network arrangements, such as the Internet, can be advantageously replaced or modified in the light of the different operating factors introduced by the mobility of a user of a mobile station in a cellular communications system.

SUMMARY OF THE INVENTION

In the light of the above, the present inventor has envisaged how routing in a packet switched network arrangement can be handled when the movement of a mobile station during receipt of information leads to the service being handed over from a first gateway to a second gateway. In particular the present inventor has envisaged that it would be advantageous to involve aspects of quality of service (QoS) within such cellular communications networks which may be affected by routing requirements introduced by the handover between gateways. Some examples of quality of service parameters that can be of significance in cellular communications are delay, jitter, bit loss ratio and bit error rate.

According to a first aspect of the present invention, there is provided a method of routing to a mobile station in a packet switched network arrangement. An initial packet switching route provided to a first cellular communications network in which a mobile station is receiving service is extended, in the event that handover of service to a second cellular communications network requires a change in the route, thereby forming an extended packet switching route, and thereafter, dependent on a level of quality of service determined for the extended route, a new packet switching route is formed to the mobile station. The various packet switching routes are established to packet switching nodes serving as gateways to the respective cellular communications networks. The different cellular communications networks are served via different gateways.

One or both of the cellular communications arrangements served by different gateways can be a UMTS network.

The various routes are formed from a source in a packet data network forming part of the packet switched network arrangement. The packet data network can comprise an information network such as the Internet.

The quality of service parameter can be additive over the various routes. This is particularly relevant when it is additive over the extended route. The quality of service parameter can comprise delay, jitter, bit loss ratio or bit error rate. Alternatively, a quality of service parameter can comprise a function of two or more of the above-mentioned parameters.

An achieved or measured level of quality of service can be compared to a threshold, and if the quality of service achieved on the extended route is below the threshold, the new replacement route is formed. The threshold can vary according to the type of data being transmitted or provided by the source.

The initial route can be formed by any appropriate routing method, including hop-by-hop routing, strict source routing and loose source routing.

The determination of the quality of service can be performed by the mobile station or by a network management entity. Similarly the decision to form a new route can be determined by the mobile station or a network management entity.

According to another aspect of the invention, there is provided an apparatus for carrying out routing to a mobile station in a packet switched network arrangement. The apparatus comprises means for forming an initial packet switching route to a first cellular communications gateway providing the service to a mobile station, means for extending, in response to the first cellular communications gateway handing over service to a second cellular communications gateway, the initial route thereby forming an extended packet switching route, and means for forming, dependent on the quality of service, a new packet switching route to the second cellular communications gateway to replace the extended route.

The extension to the initial route, and the entirely new replacement route, can each in themselves be formed by any appropriate route forming method, including hop-by-hop routing, strict source routing and loose source routing.

According to yet another aspect of the invention, there is provided a storage medium storing processor implementable instructions for controlling a processor to carry out any of the above described methods.

According to yet another aspect of the invention, there is provided a signal carrying processor implementable instructions for controlling a processor to carry out any of the above methods.

According to yet another aspect of the present invention, there is provided a cellular communications mobile station with means for analysing or determining a quality of service it is receiving when it is receiving that service through an extended communications route due to movement, and means for requesting a new communication route if that quality of service is insufficient.

The present invention advantageously retains a routing connection in a simple fashion when handover is required, yet then allows satisfactory quality of service to be maintained thereafter. Furthermore, the present invention avoids wasteful use of resources employed in establishing a new route, if the extended route is sufficient in terms of quality of service. The present invention is particularly advantageous in coping with additive quality of service parameters.

Additional specific advantages are apparent from the following description and figures.

DESCRIPTION OF AN EMBODIMENT OF THE INVENTION

Figure 1:
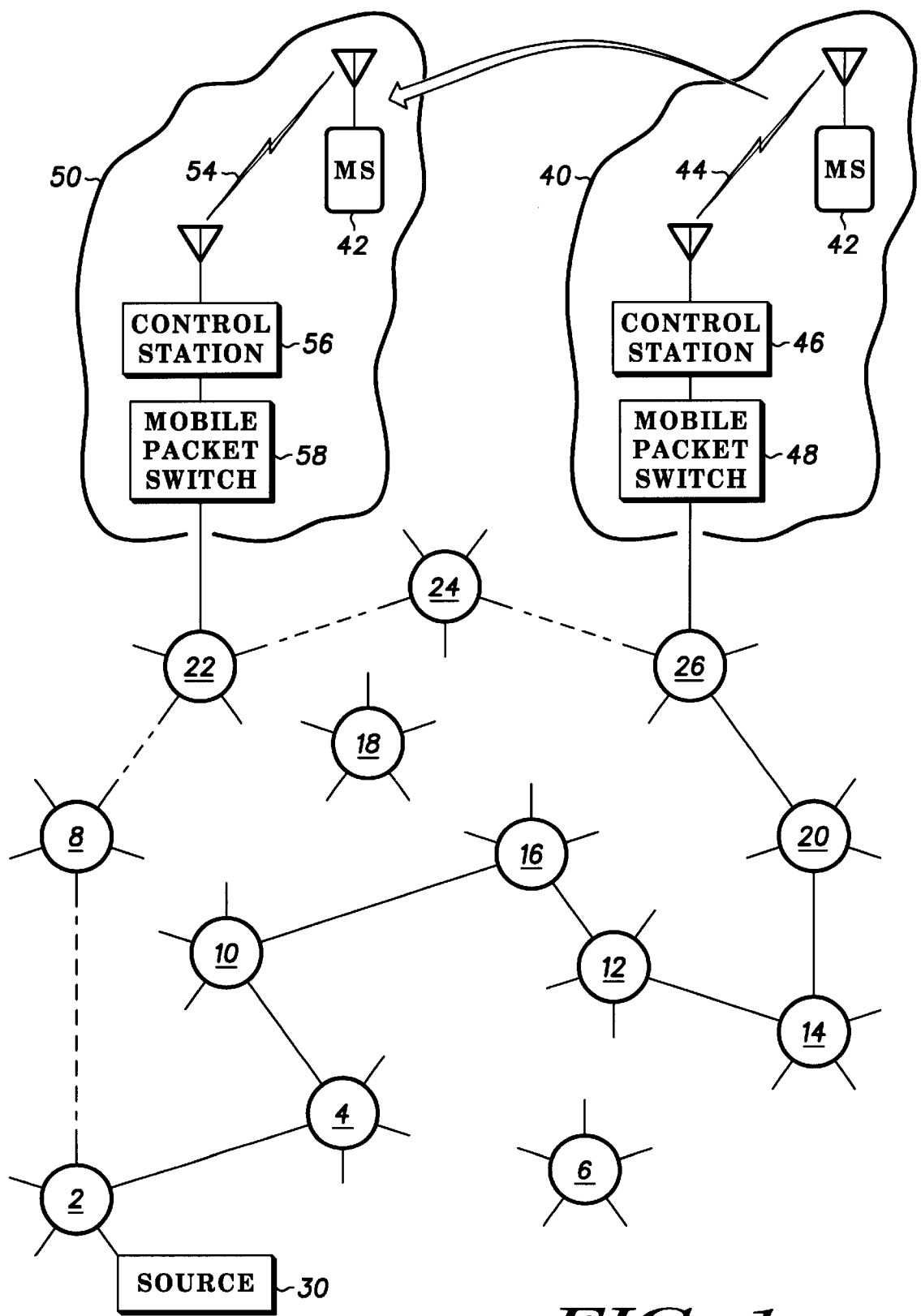
FIG. 1 is an illustration of a packet switched network arrangement in accordance with the present invention.

One particular embodiment of the invention is now described by way of example only. FIG. 1 shows, in the form of a schematic illustration, nodes 2, 4, 6, 8, 10, 12, 14, 16, 18, 20, 22, 24, 26 of a packet data network. In the present embodiment the packet data network is the Internet and the nodes are each Internet routers. In practice the Internet contains many more nodes than those shown in FIG. 1 by way of example.

A source 30 is coupled to Internet router 2. Packetized data being output by a source 30 is input into the Internet via node 2 for onward transmission to a specified destination. In the present embodiment source 30 is a work station operated by a provider of information services such as route maps, news reports and so on which can be in multimedia form. Source 30 can alternatively be any other source of data to be transmitted across the Internet.

In the present embodiment the destination for the information is any suitable mobile station (MS) 42, which in the present case is a mobile telephone. MS 42 is originally located in the geographical service area of a first cellular communications network 40. Also shown is a control station 46 of the first cellular communications network 40. In the present example the control station consists of a base station system (BSS), which itself incorporates a base station controller (BSC) and a base transceiver station (BTS). A communication link 44 is established between MS 42 and control station 46, and is in the form of a radio link. The particular geographical area served by control station 46 constitutes one cell of the first cellular communications network 40.

Control station 46 is coupled to mobile packet switch 48. In the present embodiment the first cellular communications network 40 only comprises a single mobile packet switch 48. Further control stations can be coupled to mobile packet switch 48, but these are not shown in FIG. 1.

In the present embodiment mobile packet switch 48 is coupled to Internet router 26. Internet router 26 serves as a gateway from the Internet to the first cellular communications network 40. Thus when the source 30 specifies MS 42 as the destination of data, that data will need to be routed through various Internet routers ending at Internet router 26.

FIG. 1 also shows a second cellular communications network 50. As will be described in further detail below, the operation of the present embodiment will be described for the situation when MS 42 moves from the first cellular communications network 40 to the second cellular communications network 50. The second cellular communications network 50 comprises a control station 56, and a mobile packet switch 58, both of the same sort as contained in the first cellular communications network 40. When MS 42 is served by the second cellular communicators network 50, such service is provided via a communications link 54 which is in the form of a radio link. As was the case with the first cellular communications network, in the second cellular communications network 50 there can be further control stations connected to the mobile packet switch 58, although not shown in the figure, but mobile packet switch 58 is the only mobile packet switch in the network.

Mobile packet switch 58 is coupled to Internet router 22 which serves as a gateway to the second cellular communications network. Thus when MS 42 is handed over from the first cellular communications network 40 to the second cellular communications network 50, the route through the Internet will need to be changed so as to end at Internet router 22 instead of Internet router 26.

Figure 2:
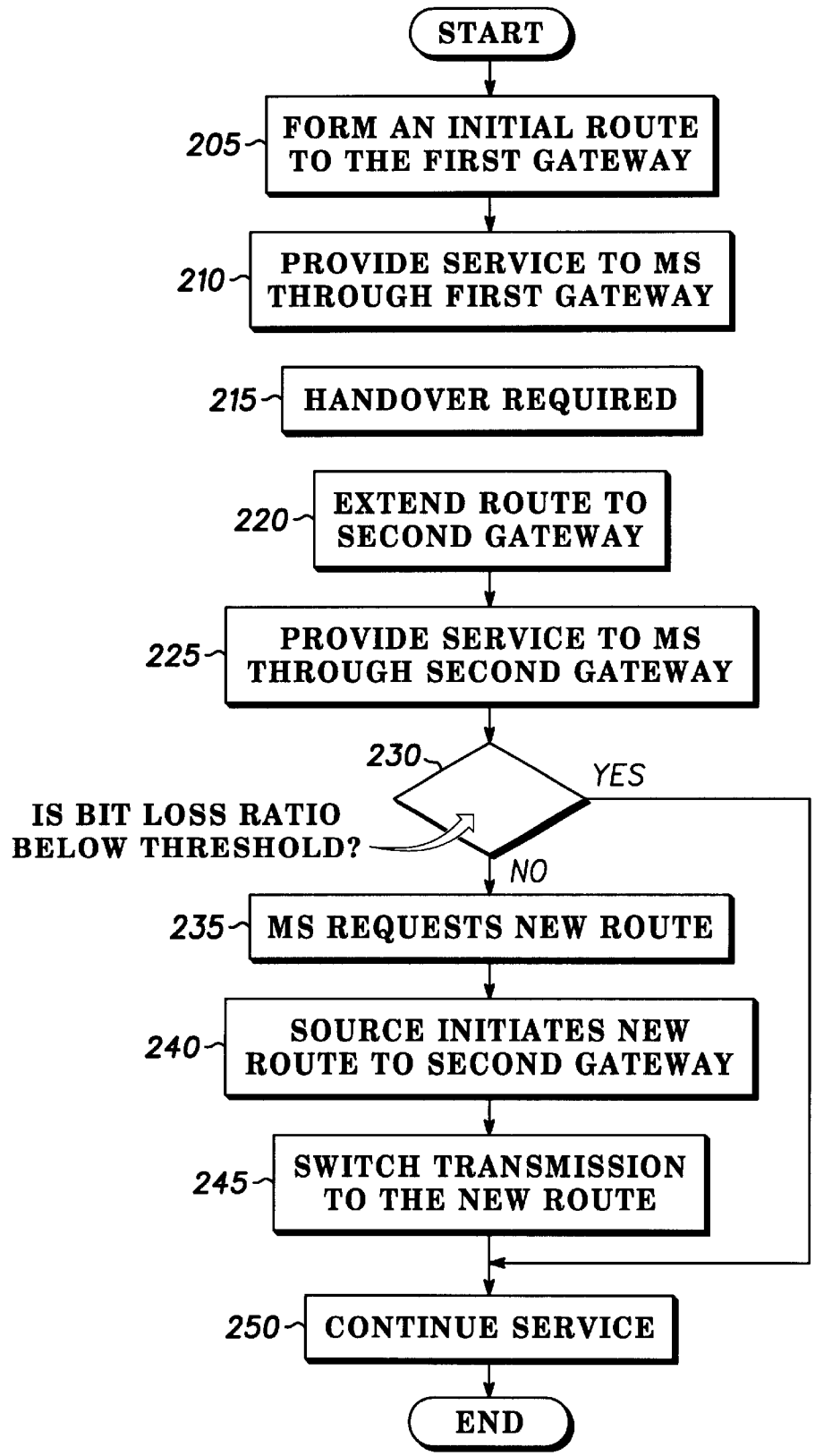
FIG. 2 is a process flow chart of an embodiment of the present invention.

The processing steps involved in the present embodiment will now be described with reference to the process flow chart of FIG. 2. Function box 205 shows the step of forming an initial route from the Internet router 2 to the Internet router 26 serving as a gateway. This is performed in response to a requirement for source 30 to send packetized data to MS 42. The initial route is formed or established by any suitable means. In the present case a conventional Internet protocol (IP) procedure is employed. More particularly, a hop-by-hop routing method is employed. Internet router 2 forms a suitable datagram for hop-by-hop routing, and thereafter the route is established in a conventional hop-by-hop manner with each router choosing an appropriate next router according to the datagram and based on the available next routers' situations. In the present case such a route is formed as shown in FIG. 1 in bold and consisting of Internet routers 2, 4, 10, 16, 12, 14, 20 and ending, as required, at Internet router 26.

The initial route can alternatively be formed by source routing. Under this procedure the overall route will be determined to a greater or lesser extent by the source node i.e. Internet router 2. In this case Internet router 2 forms datagrams including details of the route, and these datagrams can be included for example in each IP packet header. Two forms of source routing are possible in the IP network. The first is strict source routing, in which Internet router 2 specifies the exact path that the EP datagram must follow. When the route is formed for packets covered by the EP datagram, only specified next Internet routers are connected, and when instead any other Internet routers are encountered an Internet control message protocol (ICMP) source route found error message is returned to the previous Internet router. In a second type of source routing, called loose source routing, Internet router 2 includes in the datagram a list of Internet routers that the datagram must traverse, the datagram can also pass through other Internet routers between any two addresses in the list. Thereafter cellular communication service is provided to MS 42 via radio link 44 established between the control station 46 and the MS 42. As shown by function box 210, the packetized data is transmitted over the initial route to Internet router 26 (serving as gateway) and through mobile packet switch 48, control station 46 and radio link 44 to MS 42. In the present embodiment MS 42 does not monitor the quality of service whilst transmission takes place over the above described initial route. The suitability of such an approach will depend upon the details of the arrangement under consideration. In the present case, for example, MS 42 has previously established that requesting such items of information, as are being delivered in the present embodiment, consistently provides a satisfactory quality of service level so long as the MS remains in the first cellular communications network 40. In other examples, however, MS 42 may at the stage of receiving data over the initial packet switching route assess the level of quality of service it is receiving and request alternative routes dependent upon those levels.

When MS 42 moves within the first cellular communications network 40 such that it only requires to be handed over to a different cell of that system, (i.e. an area served via a different control station other than control sation 46), then no change to the Internet routing is involved because the gateway from the Internet route to the first cellular communications network remains as the gateway provided by Internet router 26. However, when MS 42 moves such that handover to the second cellular communications network becomes required, the following procedure is employed. On determination that handover is required to the second cellular communications network 50, as shown at function box 215, this information is conveyed from mobile packet switch 48 to Internet router 26, in the form of an indication that the route now needs to reach Internet router 22. Consequently, as shown at function box 220, the IP datagrams are updated and the initial packet switching route is extended in hop-by-hop fashion in the present example to Internet router 24 and then Internet router 22, as shown by long dashed lines in FIG. 1. Handover can then take place, and, as shown at function box 225, service is resumed in the second cellular communications network 50 through the new gateway 22, mobile packet switch 58, control station 56 and radio link 54.

MS 42, on determining that handover has taken place, analyses a quality of service parameter. In the present embodiment MS 42 analyses the bit loss ratio over a given period of time. The bit loss ratio is a parameter defining the number of bits that have been lost compared to the overall bits originally contained in the data transmission. Error coding and other suitable signalling data within the data transmission flow is analysed by MS 42 in order to determine the bit loss ratio. In the present embodiment MS 42 is programmed with two separate thresholds of bit loss ratio, a milder threshold of 0.02% and a harsher threshold of 0.01%. MS 42 is further programmed to employ the milder threshold when the data being transmitted does not include video, and the harsher threshold when the data being transmitted does include video. Alternatively a single threshold can be used. In the present example let us assume there is no video included in the data transmission, thus MS 42 compares its measured bit loss ratio with the milder threshold, as shown at decision box 230. Provided the measured bit loss ratio is below the threshold the communication service is continued as shown at function box 250. However, if MS 42 determines that the measured bit loss ratio is not below the threshold, then the quality of service provided by the extended route is inadequate, thus MS 42 requests a new route from source 30, as shown at function box 235. This request is made in a conventional manner over a separate route established through the Internet from gateway 22 to Internet router 2.

In response to a request from MS 42, source 30 initiates a new route to the Internet router 22, serving as the gateway to the second cellular communications network, as shown at function box 240. In the present embodiment the new route is simply established once again by the hop-by-hop method. In the present example a new route is formed from Internet router 2 to Internet router 8 and thereon to Internet router 22, as shown by dotted lines in FIG. 1. Internet router 2 then switches transmission of data to the new route instead of the extended route, i.e. the new route replaces the extended route, as shown at function box 245. Thereafter, as shown at function box 250, service is continued via the new Internet route to Internet router 22. In the above embodiment, since the quality of service parameter consisting of bit loss ratio is additive over consecutive links in the Internet route, then the reduction in quality of service produced by the addition of links to the original route, in the present example taking the quality of service below the required threshold, is overcome by the establishment of a new route which is more appropriate given that the end Internet router has now changed to Internet router 22. In the example shown in FIG. 1, the new route is likely to be better than the initial route to the first gateway (Internet router 26). However, such an improvement over the initial route is not necessary to the invention, rather the new route merely needs to be more appropriate than the extended route.

In the above embodiment the quality of service parameter measured by MS 42 was bit loss ratio over a given period of time. In other embodiments the bit loss ratio could be measured over a given number of data bits. A further bit related quality of service parameter that can be measured and employed is bit error rate, i.e. the number of bits in error per time unit, which again can be assessed by MS 42 by analysing error coding in the transmitted data stream. Further possible quality of service parameters that can be employed include those related to delay. The total delay of packets from source 30 or Internet router 2 to MS 42 or the respective gateways provided by Internet routers 22 and 26 is additive and includes the propagation delay between the different Internet routers on the route and also packet queueing delay occurring at each Internet router or other node. MS 42 measures and analyses the delay experienced by received packets by further using a special probe message (based on ICMP messages) which is sent by Internet router 2 and which serves to synchronise a timer of the work station used at source 30 and a timer of MS 42. Quality of service parameters derivable from delay characteristic include maximum experienced delay, and jitter, where jitter can be defined either as average delay or as a difference between a maximum and a minimum delay.

In the above embodiment a single parameter, namely bit loss ratio was employed. Other alternative single parameters have been described. In further embodiments of the present invention, further quality of service parameters can be defined and employed, including functions of two or more of the above described single parameters. In the above embodiment each of the first and second cellular communication networks are any suitable forms of network. One preferred option is for one or both of the networks to be a UMTS network. Another preferred option is for one or both of the networks to be a general packet radio switch (GPRS) network.

In other embodiments, other forms of public data network other than the Internet can be employed. Similarly, other types of networks such as restricted access networks and private networks can be employed.

In the above embodiments the quality of service parameter was determined and measured by the mobile station, and similarly the decision to form a new route was determined by MS 42. In other embodiments these functions can be either shared by or fully performed by entities other than MS 42. In particular a network management entity can carry out these functions. Any suitable network management entity can be employed, for example a control function associated with one of the Internet routers, preferably either Internet router 2 or a gateway providing router such as 22 and 26, but also possibly any Internet router included in an established route. Similarly, source 30 can perform some or all of these functions. Whichever item performs the above functions, they are implemented by one or more processors. The or each processor is implemented in the form of software running on a suitable processor such as a microcontroller or digital signal processor, or is implemented in the form of specifically designed hardware or a combination of hardware and software. The processor can be controlled by processor implementable instructions, for carrying out the method steps described in the above embodiments, which are stored in a storage medium. The storage medium can be a disk, e.g. floppy disk or hard disk, memory such as RAM, or any other appropriate medium. Alternatively, the or each processor can receive the instructions via a signal carrying the processor implementable instructions. In the above main embodiment, the new replacement route from Internet router 2 to Internet router 8 and then on to Internet router 22 was performed by a hop-by-hop routing method. In other embodiments the new route is performed by one of the above described source routing methods in order to further ensure satisfactory quality of service on the eventually established route. In the above embodiment the quality of service on the originally extended route was compared to a threshold. In other embodiments the quality of service of the extended route can be processed relative to criteria other than a fixed threshold. One possibility is to compare the quality of service of the extended route to the quality of service measured and achieved on the initial route and to only form a new replacement route if the quality of service of the extended route falls below that of the initial route. Another alternative is to only form a new route if the quality of service via the extended route falls below the quality of service of the initial route by a given proportion.

In the above embodiment the first cellular communications network 40 and the second cellular communications network 50 are made up of separate hardware such as the separate control stations and separate mobile packet switches. Their respective geographical service areas overlap such that handover can take place, and this is performed analogously to handover between cells of a single cellular communications network. In other embodiments there are other respective relationships between two items, conveniently termed networks or communication systems. Indeed, the present invention can be applied to any scenario in which a mobile station initially receives service in one constellation, domain or facet of a cellular communications arrangement employing a first gateway from the packet switched data network, and changes over to a second constellation, domain or facet of a cellular communications arrangement requiring service to be provided via a second gateway from the packet switched data network. Furthermore, the term gateway refers to any suitable interface where a cellular communications arrangement interfaces with the other parts of an overall packet switched network arrangement.

I claim:

1. A method of routing to a mobile station in a packet switched network arrangement, the method comprising the steps of:

forming an initial packet switching route to a first cellular communications gateway providing service to a mobile station;

extending, in response to said first cellular communications gateway handing over service to a second cellular communications gateway to support a handover of the mobile station from a first cell associated with the first cellular communications gateway to a second cell associated with the second communications gateway, said initial packet switching route from the first cellular communications gateway to the second communications gateway to form an extended packet switching route; and forming, responsive to a level of a quality of service parameter achieved over said extended packet switching route from a source to said second cellular communications gateway, a new packet switching route to said second cellular communications gateway to replace said extended packet switching route.

2. A method according to claim 1, wherein the different cellular communications gateways serve different cellular communications networks.

3. A method according to claim 2, wherein at least one of said cellular communications networks is a UMTS network.

4. A method according to claim 1, wherein said initial packet switching route and said extended packet switching route are formed from a source in a packet data network.

5. A method according to claim 4, wherein said packet data network is the Internet.

6. A method according to claim 1, wherein said quality of service parameter is additive over said extended packet switching route.

7. A method according to claim 6, wherein said quality of service parameter comprises one of the following or a function of a plurality of the following:

(a) delay;

(b) jitter;

(c) bit loss ratio;

(d) bit error rate.

8. A method according to claim 1, wherein an achieved level of said quality of service parameter is compared to a threshold to determine the step of forming the new packet switching route.

9. A method according to claim 8, wherein said threshold varies according to a type of data being communicated or to be communicated over said extended packet switching route.

10. A method according to claim 1, wherein said initial packet switching route and/or said extended packet switching route and/or said new packet switching route is formed by hop-by-hop routing.

11. A method according to claim 1, wherein said initial packet switching route and/or said extended packet switching route and/or said new packet switching route is formed by source routing.

12. A method according to claim 1, wherein said achieved level of said quality of service parameter is determined and/or a decision to form said new packet switching route is determined by a network management entity.

13. A method according to claim 1, wherein said achieved level of said quality of service parameter is determined and/or a decision to form said new packet switching route is determined by said mobile station.

14. Apparatus for routing to a mobile station in a packet switched network arrangement, the apparatus comprising:

means for forming an initial packet switching route to a first cellular communications gateway providing service to a mobile station;

means for extending, in response to said first cellular communications gateway handing over service to a second cellular communications gateway to support a handover of the mobile station from a first cell associated with the first cellular communications gateway to a second cell associated with the second communications gateway, said initial packet switching route from the first cellular communications gateway to the second communications gateway to form an extended packet switching route; and means for forming, responsive to a level of a quality of service parameter achieved over said extended packet switching route from a source to said second cellular communications gateway, a new packet switching route to said second cellular communications gateway to replace said extended packet switching route.

15. Apparatus according to claim 14, wherein different cellular communications gateways serve different cellular communications networks.

16. Apparatus according to claim 15, wherein at least one of said cellular communications networks is a UMTS network.

17. Apparatus according to claim 14, wherein said packet switching routes are formed from a source in a packet data network.

18. Apparatus according to claim 17, wherein said packet data network is the Internet.

19. Apparatus according to claim 14, wherein said quality of service parameter is additive over said extended packet switching route.

20. Apparatus according to claim 19, wherein said quality of service parameter comprises one of the following or a function of a plurality of the following:

(a) delay;

(b) jitter;

(c) bit loss ratio;

(d) bit error rate.

21. Apparatus according to claim 14, further comprising means for comparing an achieved level of said quality of service parameter to a threshold to determine operation of said means for forming said new packet switching route.

22. Apparatus according to claim 21, wherein said threshold varies according to the type of data being communicated or to be communicated over said extended packet switching route.

23. Apparatus according to claim 14, wherein said means for forming said initial packet switching packet switching route and/or said means for forming said extended packet switching route and/or said means for forming said new packet switching route is adapted to employ hop-by-hop routing.

24. Apparatus according to claim 14, wherein said means for forming said initial packet switching route and/or said means or forming said extended packet switching route and/or said means for forming said new packet switching route is adapted to employ source routing.

* * * * *